(12) United States Patent
Hu et al.

(10) Patent No.: US 8,628,823 B2
(45) Date of Patent: Jan. 14, 2014

(54) METHODS AND SYSTEMS FOR MAKING PATTERNED PHOTORECEPTOR OUTER LAYER

(75) Inventors: Nan-Xing Hu, Oakville (CA); Gregory McGuire, Oakville (CA); Richard A. Klenkler, Oakville (CA); Yvan Gagnon, Mississauga (CA); Gaetano J. Lavigne, Burlington (CA)

(73) Assignee: Xerox Corporation, Norwalk, CT (US)

( * ) Notice: Subject to any disclaimer, the term of this patent is extended or adjusted under 35 U.S.C. 154(b) by 69 days.

(21) Appl. No.: 13/162,371

(22) Filed: Jun. 16, 2011

(65) Prior Publication Data
US 2012/0321799 A1    Dec. 20, 2012

(51) Int. Cl.
*B05D 3/00* (2006.01)
*B05D 3/12* (2006.01)

(52) U.S. Cl.
USPC ............ 427/278; 427/256; 427/270; 427/277

(58) Field of Classification Search
USPC ......... 427/256, 270, 277, 278, 355, 359, 369, 427/370, 428.06; 430/133
See application file for complete search history.

(56) References Cited

U.S. PATENT DOCUMENTS

| | | | |
|---|---|---|---|
| 2,021,006 A | | 2/1964 | Middleton et al. |
| 3,214,310 A | * | 10/1965 | Di Leo et al. ................. 216/9 |
| 4,338,387 A | | 7/1982 | Hewitt |
| 4,387,980 A | | 6/1983 | Ueno et al. |
| 4,587,189 A | | 5/1986 | Hor et al. |
| 4,588,545 A | * | 5/1986 | Kauffman et al. ........... 264/46.4 |
| 4,664,995 A | | 5/1987 | Horgan et al. |
| 4,921,773 A | | 5/1990 | Melnyk et al. |
| 5,008,706 A | * | 4/1991 | Ohmori et al. ................ 399/174 |
| 5,069,993 A | | 12/1991 | Robinette et al. |
| 5,756,245 A | | 5/1998 | Esteghamatian et al. |
| 5,965,243 A | * | 10/1999 | Butler et al. ................ 428/195.1 |
| 2003/0004231 A1 | * | 1/2003 | Ehmann et al. ............... 523/400 |
| 2006/0123867 A1 | * | 6/2006 | Ball et al. ........................ 72/197 |
| 2006/0233972 A1 | * | 10/2006 | Muramatsu et al. ......... 428/1.31 |
| 2007/0281239 A1 | * | 12/2007 | Uematsu et al. .............. 430/133 |
| 2009/0208856 A1 | * | 8/2009 | Wu et al. ....................... 430/57.3 |

* cited by examiner

*Primary Examiner* — Michael Cleveland
*Assistant Examiner* — James M Mellott
(74) *Attorney, Agent, or Firm* — Pillsbury Winthrop Shaw Pittman LLP

(57) ABSTRACT

The presently disclosed embodiments relate generally to layers that are useful in imaging apparatus members and components, for use in electrophotographic, including digital, apparatuses. Embodiments pertain to an improved electrophotographic imaging member incorporating an outer layer having a groove pattern imprinted into its surface to lower friction with the cleaning blade and improve print quality and performance. Embodiments also pertain to methods and systems for making the improved imaging member.

12 Claims, 5 Drawing Sheets

METHODS AND SYSTEMS FOR MAKING PATTERNED PHOTORECEPTOR OUTER LAYER

BACKGROUND

The presently disclosed embodiments relate generally to layers that are useful in imaging apparatus members and components, for use in electrophotographic, including digital, apparatuses. More particularly, the embodiments pertain to an improved electrophotographic imaging member comprising an outer layer having a pattern imprinted into its surface to lower friction with the cleaning blade and improve print quality and performance. The embodiments also pertain to methods and systems for making the improved electrophotographic imaging member.

In electrophotographic printing, the charge retentive surface, typically known as a photoreceptor, is electrostatically charged, and then exposed to a light pattern of an original image to selectively discharge the surface in accordance therewith. The resulting pattern of charged and discharged areas on the photoreceptor form an electrostatic charge pattern, known as a latent image, conforming to the original image. The latent image is developed by contacting it with a finely divided electrostatically attractable powder known as toner. Toner is held on the image areas by the electrostatic charge on the photoreceptor surface. Thus, a toner image is produced in conformity with a light image of the original being reproduced or printed. The toner image may then be transferred to a substrate or support member (e.g., paper) directly or through the use of an intermediate transfer member, and the image affixed thereto to form a permanent record of the image to be reproduced or printed. Subsequent to development, excess toner left on the charge retentive surface is cleaned from the surface. The process is useful for light lens copying from an original or printing electronically generated or stored originals such as with a raster output scanner (ROS), where a charged surface may be imagewise discharged in a variety of ways.

The described electrophotographic copying process is well known and is commonly used for light lens copying of an original document. Analogous processes also exist in other electrophotographic printing applications such as, for example, digital laser printing or ionographic printing and reproduction where charge is deposited on a charge retentive surface in response to electronically generated or stored images.

To charge the surface of a photoreceptor, a scorotron charging device or a contact type charging device has been used. The contact type charging device includes a conductive member which is supplied a voltage from a power source with a D.C. voltage superimposed with a A.C. voltage of no less than twice the level of the D.C. voltage. The charging device contacts the image bearing member (photoreceptor) surface, which is a member to be charged. The outer surface of the image bearing member is charged with the rubbing friction at the contact area. The contact type charging device charges the image bearing member to a predetermined potential. Typically the contact type charger is in the form of a roll charger such as that disclosed in U.S. Pat. No. 4,387,980, the relative portions thereof incorporated herein by reference.

Multilayered photoreceptors or imaging members have at least two layers, and may include a substrate, a conductive layer, an optional undercoat layer (sometimes referred to as a "charge blocking layer" or "hole blocking layer"), an optional adhesive layer, a photogenerating layer (sometimes referred to as a "charge generation layer," "charge generating layer," or "charge generator layer"), a charge transport layer, and an optional overcoating layer in either a flexible belt form or a rigid drum configuration. In the multilayer configuration, the active layers of the photoreceptor are the charge generation layer (CGL) and the charge transport layer (CTL). Enhancement of charge transport across these layers provides better photoreceptor performance. Multilayered flexible photoreceptor members may include an anti-curl layer on the backside of the substrate, opposite to the side of the electrically active layers, to render the desired photoreceptor flatness.

Development of long life photoreceptors includes the development of low wear protective overcoat layers. These layers help facilitate dramatically reduced surface wear. However, these layers also often introduce a host of unwanted issues including blade damage, cleaning failure, print defects, and high torque. All of these issues arise due to the poor interaction between the cleaning blade and the overcoat layer. In an attempt to resolve these issues, there have been two main approaches. The first is to focus on material changes to the overcoat in order to improve the interaction between the blade and the overcoat. Examples of such material changes include the addition of low surface energy additives and healing materials to reduce the friction. The second approach is to change the surface morphology via patterning of the overcoat layer surface. This second approach has faced obstacles in that creating a permanent pattern on the overcoat layers is often difficult as the pattern tends to be transient. Thus, there is a need for an improved imaging layer that achieves extended service lifetime and does not suffer from the above-described problems.

The term "photoreceptor" or "photoconductor" is generally used interchangeably with the terms "imaging member." The term "electrophotographic" includes "electrostatographic" and "xerographic." The terms "charge transport molecule" are generally used interchangeably with the terms "hole transport molecule."

SUMMARY

In one embodiment, there is provided a method for making an imprinted imaging member comprising: coating an imaging member with an outer layer formulation; ambient drying the outer layer formulation to form an outer layer on the imaging member; and pressing a rigid rod having a surface pattern against the outer layer on the imaging member; and rolling the rigid rod against the outer layer on the imaging member to form a surface pattern imprinted on the surface of the outer layer; and curing the imaging member to form an imprinted imaging member. In further embodiments, the pressing and rolling step is performed at an elevated temperature.

In another embodiment, there is provided a system for making an imprinted imaging member comprising: an imprinting rod for imprinting the imaging member; and an imaging member comprising a substrate, one or more imaging layers disposed on the substrate, and an outer layer disposed on the one or more imaging layers. In such embodiments, the imprinting rod may be placed in contact with the imaging member during curing of the outer layer.

In yet another embodiment, there is provided a system for making an imprinted imaging member comprising: a screw mount for mounting an imaging member to be imprinted; an imprinting rod for imprinting the imaging member; and a pressure subsystem for pressing and rolling the imprinting rod against the imaging member.

BRIEF DESCRIPTION OF THE DRAWINGS

For a better understanding, reference may be made to the accompanying figures.

DETAILED DESCRIPTION

Figure 1:
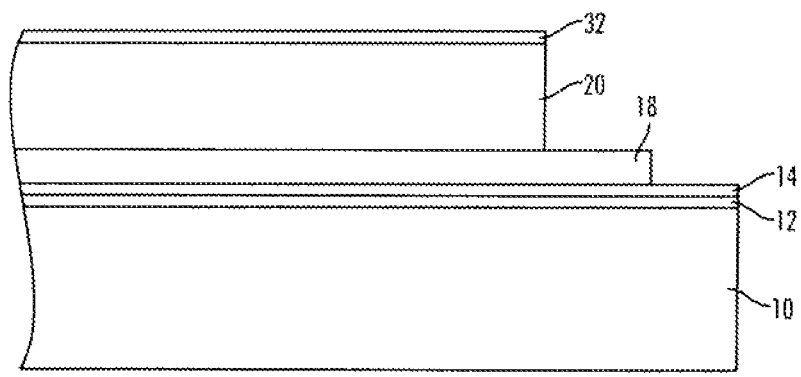
FIG. 1 is a cross-sectional view of an imaging member in a drum configuration according to the present embodiments.

In the following description, reference is made to the accompanying drawings, which form a part hereof and which illustrate several embodiments. It is understood that other embodiments may be used and structural and operational changes may be made without departure from the scope of the present disclosure.

The presently disclosed embodiments are directed generally to an improved electrophotographic imaging member comprising an outer layer having a pattern imprinted into its surface to lower friction with the cleaning blade and improve print quality and performance. The embodiments also pertain to methods for making the improved electrophotographic imaging member.

The exemplary embodiments of this disclosure are described below with reference to the drawings. The specific terms are used in the following description for clarity, selected for illustration in the drawings and not to define or limit the scope of the disclosure. The same reference numerals are used to identify the same structure in different figures unless specified otherwise. The structures in the figures are not drawn according to their relative proportions and the drawings should not be interpreted as limiting the disclosure in size, relative size, or location. In addition, though the discussion will address negatively charged systems, the imaging members of the present disclosure may also be used in positively charged systems.

FIG. 1 is an exemplary embodiment of a multilayered electrophotographic imaging member having a drum configuration. As can be seen, the exemplary imaging member includes a rigid support substrate 10, an electrically conductive ground plane 12, an undercoat layer 14, a charge generation layer 18 and a charge transport layer 20. The rigid substrate may be comprised of a material selected from the group consisting of a metal, metal alloy, aluminum, zirconium, niobium, tantalum, vanadium, hafnium, titanium, nickel, stainless steel, chromium, tungsten, molybdenum, and mixtures thereof. The charge generation layer 18 and the charge transport layer 20 forms an imaging layer described here as two separate layers. In an alternative to what is shown in the figure, the charge generation layer may also be disposed on top of the charge transport layer. It will be appreciated that the functional components of these layers may alternatively be combined into a single layer.

Figure 2:
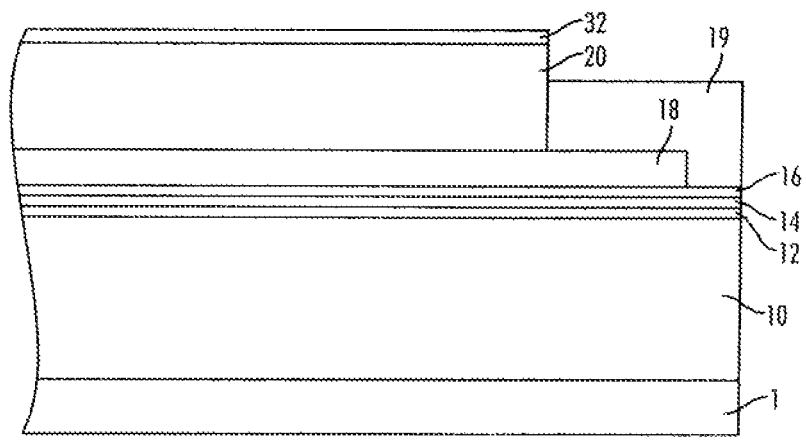
FIG. 2 is a cross-sectional view of an imaging member in a belt configuration according to the present embodiments.

FIG. 2 shows an imaging member having a belt configuration according to the embodiments. As shown, the belt configuration is provided with an anti-curl back coating 1, a supporting substrate 10, an electrically conductive ground plane 12, an undercoat layer 14, an adhesive layer 16, a charge generation layer 18, and a charge transport layer 20. An optional overcoat layer 32 and ground strip 19 may also be included. An exemplary photoreceptor having a belt configuration is disclosed in U.S. Pat. No. 5,069,993, which is hereby incorporated by reference.

Print defects due to cleaning failure and high torque are some of the main issues in xerographic sub-systems, and typically observed when a low wear overcoated photoreceptor is used.

The present embodiments provide a xerographic photoreceptor that includes a surface-structured outer layer by employing a novel imprinting method. In embodiments, the imprinted outer layer may be a polymeric or PASCO type overcoat layer, or a charge transport layer. A PASCO overcoating layer formulation may comprise a hydroxyl-containing charge transport molecule, a polyol polymer binder, and a melamine-based curing agent, which, upon thermal curing, will form a crosslinked overcoat. The imprinting provides a uniform roughened surface to the outer layer, that is, roughened such that the surface is marked by irregularities, protuberances, or ridges, and is not smooth. In addition, the roughness is homogenous in degree, or regular and even throughout the surface of the outer layer. This imprinted surface offers lower friction with the cleaning blade, and thus improved print quality and smoother interaction to minimize blade damage. Thus, it is expected that the controlled photoreceptor morphology helps extend customer replacement units (CRU) life.

The imprinting method and system can give homogenously periodic and wide patterns on the outer layer surface. Depending on the design of the flexible mold, the morphology of the surface may be controlled, resulting in a "designed roughened" surface for improved system interactions, for instance, reduced torque, minimized blade damage and minimized non-uniform photoreceptor wear. In this disclosure, it is also shown that photoreceptors which employ outer layers with the imprinted surface pattern exhibit improved print quality, reduced blade damage and cleaning failures and extended overall CRU life.

Figure 3:
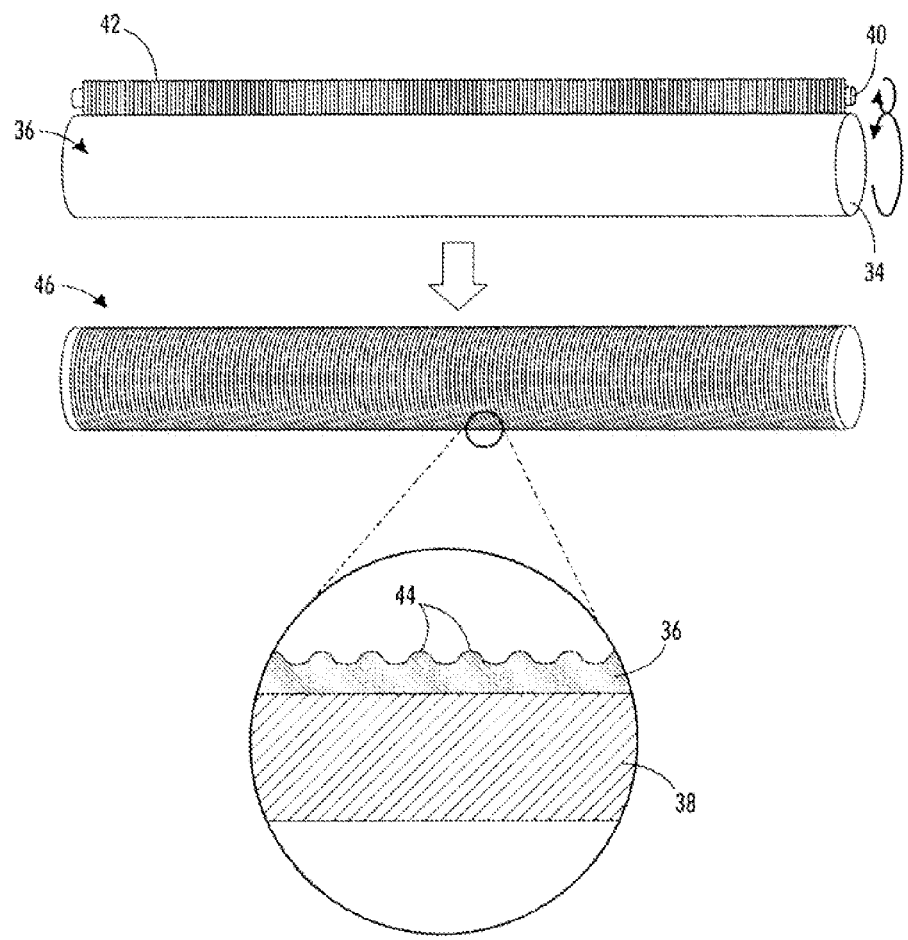
FIG. 3 is a diagram illustrating the steps for making an imaging member according to the present embodiments.

In particular, the method for making the imprinted imaging member is shown in FIG. 3. The present embodiments provides a simple and effective way to imprint a permanent groove pattern onto an outer layer surface 36 to improve interaction between the cleaning blade and the photoreceptor 34. The outer layer 36 is coated onto a charge transport layer 38.

A rigid rod 40 is pressed and rolled with high pressure against the photoreceptor 34 during a specific time period after coating, but before curing, of the outer layer 36. In certain embodiments, the rod 40 comprises a wire 42 tightly wound around the rod 40. In other embodiments, the rigid rod 40 comprises a rod that is manufactured with a surface pattern on the outer surface of the rod 40. The surface pattern will be the complement to the pattern to embed into the outer layer 26. The surface patterns may include, for example, an array of periodically ordered indentations and/or protrusions of various sizes, depths and height. The protrusions and/or indentations may also be in the shape of circles, rods, squares, triangles, polygons, mixtures thereof, and the like. The protrusions and/or indentations may also take the shape of grooves, ridges, or channels.

The outer layer 36 is subjected to ambient drying conditions prior to imprinting. In embodiments, the ambient drying takes place of from about 1 to about 20 minutes, or from about 5 to about 10 minutes. In embodiments, the rod 40 is rolled against the photoreceptor 34 at a force of from about 10 to about 1000 Newtons, or from about 100 to about 200 Newtons. The step of pressing and rolling takes place from about 1 minutes to about 20 minutes, or from about 5 minutes to about 10 minutes after coating (i.e., immediately after the ambient drying step). The step of pressing and rolling takes place during partial curing of the outer layer 36. The rod 40 imprints a groove pattern 44 into the outer layer 36 to produce a patterned photoreceptor 46. In order to ensure a permanent imprint, specific conditions must be met. For example, there must be forced air and high temperatures during imprinting and the rotations per minute of the photoreceptor must be within a specific range. In embodiments, the forced air creates photoreceptor surface temperatures that are elevated (as measured with an infrared (IR) probe) of from about 50° C. to about 200° C., or from about 100° C. to about 170° C. The rotations of the photoreceptor are at least about 30 rpm, or more specifically from about 60 rpm to about 120 rpm. Without these parameters, the groove pattern will be transient and disappear during curing of the overcoat layer or even during ambient air drying.

After imprinting, the patterned photoreceptor 46 is cured. In embodiments, the patterned photoreceptor 46 is cured in an oven at a temperature of from about of from about 120° C. to about 170° C. for about 5 minutes to about 60 minutes. The groove pattern offers greatly improved interaction between the cleaning blade and the overcoat layer which in turn improves print quality, reduces blade damage and cleaning failures and extends overall CRU life.

Figure 4:
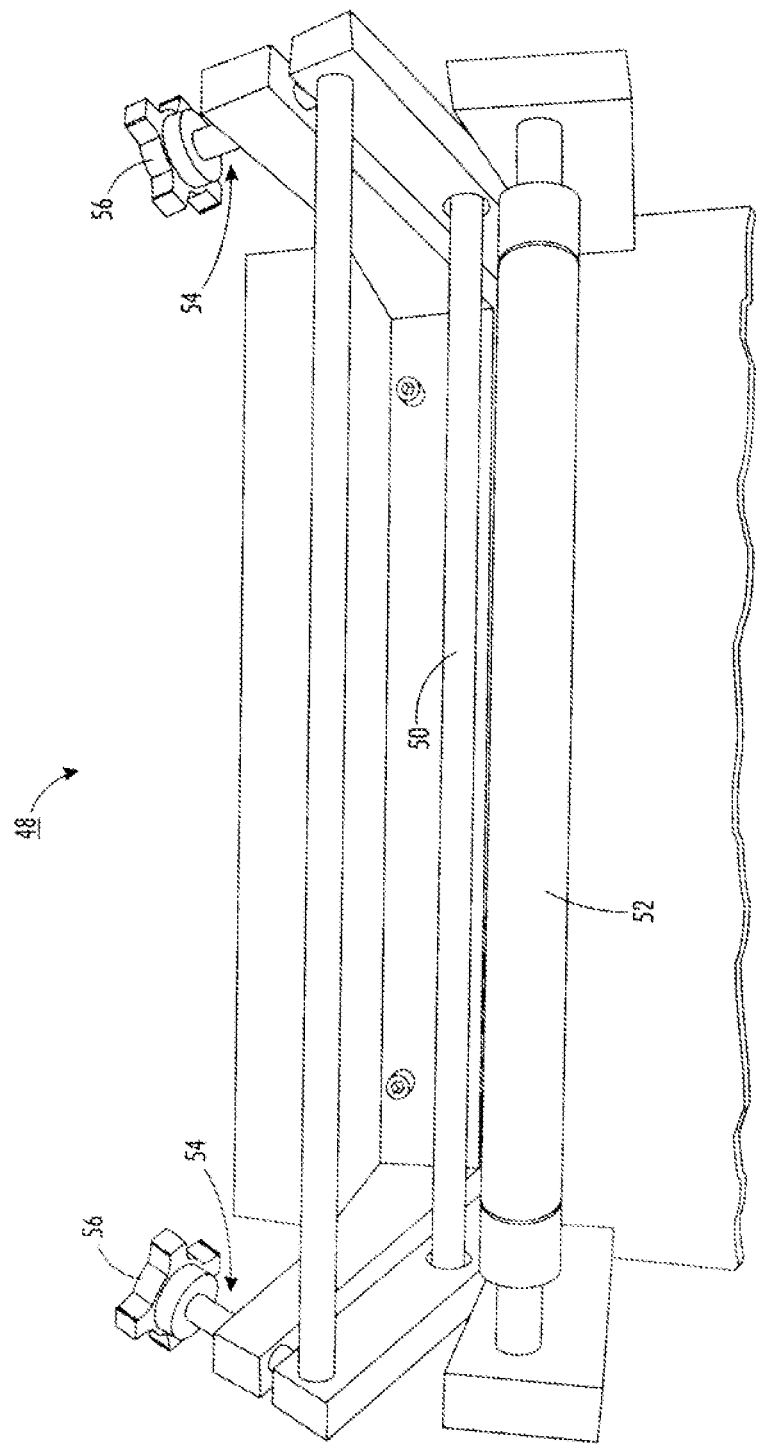
FIG. 4 is a system for making an imaging member according to the present embodiments.

In embodiments, there is provided a system for making the imprinted imaging member, as shown in FIG. 4. The system 48 comprises an imprinting rod 50 mounted on a spring loaded and pressure screw mount. The imprinting rod 50 is a freely rotating rigid rod with a tightly wound fine wire. In embodiments, the wire and rod are made from metallic materials such as steel; nickel, titanium nitride, and chrome. Other materials such as glass, plastics, ceramics, and composites can also be included so long as the materials are able to form a patterning rigid rod with a yield strength greater than the imaging member surface to be patterned. As used herein, the term "rigid" is used to indicate a material that is not flexible. In embodiments, the imprinting rod has a diameter of from about 5 millimeters to about 15 millimeters. In one embodiment, the imprinting rod has a diameter of about equal diameter to the imaging member drum. A photoreceptor drum 52 is mounted onto an anchored support and the imprinting rod 50 can then be pressure set against the drum via a pressure sub-system 54. The pressure sub-system 54 comprises a hand crank 56 which is connected to the freely rotating photoreceptor drum 52. The two cylinders (e.g., drum 52 and imprinting rod 50) can be rotated together under pressure. Uniform contact between the drum 52 and the imprinting rod 50 is an issue as both are very rigid. To overcome this issue, a TEFLON or polymeric counter roller may be used to apply uniform pressure onto the imprinting rod 50 toward the photoreceptor drum 52.

In particular embodiments, the outer layer coating of the imaging member comprises a charge transport component and a polymer binder. In such embodiments, the charge transport component comprises a tertiary arylamine selected from the group consisting of N,N'-diphenyl-N,N'-bis(3-methylphenyl)-(1,1'-biphenyl)-4,4'-diamine, N,N'-diphenyl-N,N'-bis(4-methylphenyl)-(1,1'-biphenyl)-4,4'-diamine, N,N,N',N'-tetrakis(4-methylphenyl)-1,1'-biphenyl)-4,4'-diamine, N,N'-bis(4-butylphenyl)-N,N'-di-p-tolyl-[p-terphenyl]-4,4'-diamine, and N,N'-bis(4-butylphenyl)-N,N'-di-m-tolyl-[p-terphenyl]-4,4'-diamine, and mixtures thereof.

Furthermore, the outer layer coating may, in embodiments, comprise a curable composition comprising charge transport component and a curing agent. The curing agent may be selected from the group consisting of a melamine-formaldehyde resin, a phenol resin, an isocyalate or a masking isocyalate compound, an acrylate resin, a polyol resin, or the mixture thereof.

In one embodiment, the outer layer is an overcoat layer that comprises a cross-linked composition further comprising a charge transport component. In embodiments, the cross-linked composition is the result of curing and polymerization of a charge transport component further comprising a tertiary arylamine having at least a curable functional group selected from the group consisting of a hydroxyl, a hydroxymethyl, an alkoxymethyl, a hydroxyalkyl having from 1 to about 15 carbons, an acrylate, and the mixture thereof.

In specific embodiments, there is provided an imaging member such that, positioned in between the substrate and the outer layer coating, there is positioned a charge generation layer comprising a photosensitive pigment selected from the group consisting of metal free phthalocyanine, titanyl phthalocyanine, chlorogallium phthalocyanine, hydroxygallium phthalocyanine, and a mixture of alkylhydroxy gallium phthalocyanine and hydroxygallium phthalocyanine, and a perylene, and the mixture thereof. The wherein said substrate is in a cylinder, a drum, or a belt configuration.

In further embodiments, the surface pattern comprises multiple grooves produced by the rod imprint. In embodiments, the high points of the groove pattern have a height of from about 0.1 to about 6 microns, or from about 1 to about 3 microns. The low points of the groove pattern have a depth of from about 0.1 to about 6 microns, or from about 1 to about 3 microns. In further embodiments, the array of high points or low points have a center-to-center distance of from about 10 microns to about 1000 microns, or from about 300 microns to about 600 microns. The surface pattern may include high and low points being of equidistance from one another in an evenly distributed pattern across the surface of the outer layer of the photoreceptor and forming a uniform roughened pattern on the surface of the photoreceptor.

In further embodiments, there is provided an imaging forming apparatus comprising an imaging member or photoreceptor as described above, a charging unit that applies electrostatic charge on the imaging member, a developing unit that develops toner image onto the imaging member, a transfer unit that transfers the toner image from the imaging member to a media, and a cleaning unit that cleans the imaging member. In embodiments, the cleaning unit of the image forming apparatus may comprise a blade-type cleaner comprised of an elastic polymer. In these embodiments, the groove pattern offers greatly improved interaction between the cleaning blade and the overcoat layer which improves print quality, reduces blade damage and cleaning failures and extends overall CRU life.

The Overcoat Layer

Other layers of the imaging member may include, for example, an optional over coat layer 32. An optional overcoat layer 32, if desired, may be disposed over the charge transport layer 20 to provide imaging member surface protection as well as improve resistance to abrasion. In embodiments, the overcoat layer 32 may have a thickness ranging from about 0.1 micrometer to about 25 micrometers or from about 1 micrometer to about 15 micrometers, or in a specific embodiment, about 3 to about 10 micrometers. These overcoating layers may include a charge transport component and an optional organic polymers or inorganic polymers.

In embodiments, the overcoat layer may include a charge transport component. In particular embodiments, the overcoat layer comprises a charge transport component comprised of a tertiary arylamine containing a substituent capable of self cross-linking or reacting with the polymer resin to form cured composition. Specific examples of charge transport component suitable for overcoat layer comprise the tertiary arylamine with a general formula of

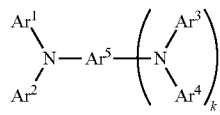

wherein $Ar^1$, $Ar^2$, $Ar^3$, and $Ar^4$ each independently represents an aryl group having about 6 to about 30 carbon atoms, $Ar^5$ represents aromatic hydrocarbon group having about 6 to about 30 carbon atoms, and k represents 0 or 1, and wherein at least one of $Ar^1$, $Ar^2$, $Ar^3$ $Ar^4$, and $Ar^5$ comprises a substituent selected from the group consisting of hydroxyl (—OH), a hydroxymethyl (—CH$_2$OH), an alkoxymethyl (—CH$_2$OR, wherein R is an alkyl having 1 to about 10 carbons), a hydroxylalkyl having 1 to about 10 carbons, and mixtures thereof. In other embodiments, $Ar^1$, $Ar^2$, $Ar^3$, and $Ar^4$ each independently represent a phenyl or a substituted phenyl group, and $Ar^5$ represents a biphenyl or a terphenyl group.

Additional examples of charge transport component which comprise a tertiary arylamine include the following:

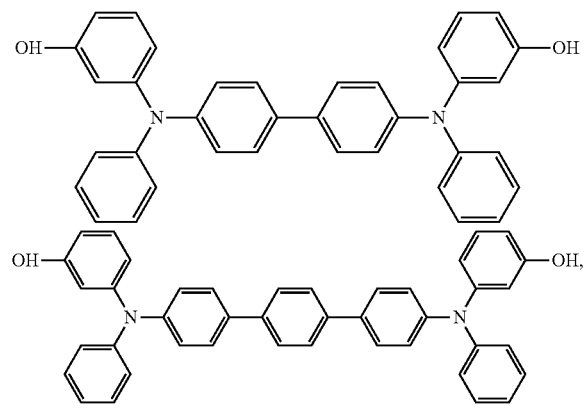

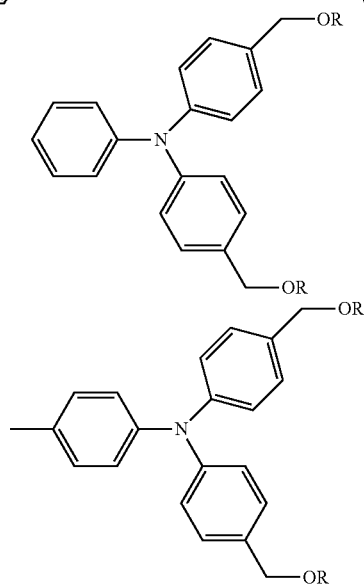

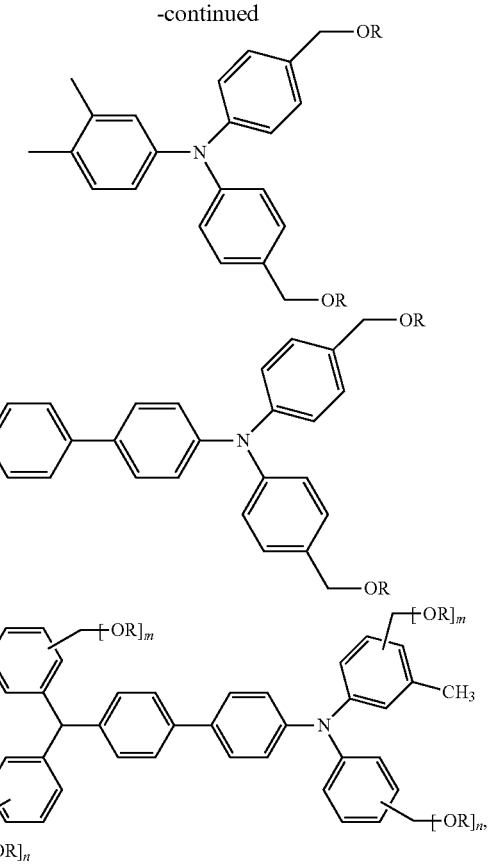

and the like, wherein R is a substituent selected from the group consisting of hydrogen atom, and an alkyl having from 1 to about 6 carbons, and m and n each independently represents 0 or 1, wherein m+n>1. In specific embodiments, the overcoat layer may include an additional curing agent to form a cured overcoat composition. Illustrative examples of the curing agent may be selected from the group consisting of a melamine-formaldehyde resin, a phenol resin, an isocyalate or a masking isocyalate compound, an acrylate resin, a polyol resin, or the mixture thereof. In specific embodiments, the charge or hole transport molecule is selected from the group consisting of N,N'-diphenyl-N—N'-bis hydroxyphenyl)-[1,1'-terphenyl]-4,4'-diamine, and N,N'-diphenyl-N,N-bis(3-hydroxyphenyl)-[1,1'-biphenyl]-4,4'-dia-mine, and mixtures thereof.

In further embodiments, the overcoat layer may also include a crosslinking agent, an optional resin and/or one or more optional surface additives. In such embodiments, the crosslinking agent is selected from the group consisting of methylated formaldehyde-melamine resin, methoxymethylated melamine resin, ethoxymethylated melamine resin, propoxymethylated melamine resin, butoxymethylated melamine resin, hexamethylol melamine resin, alkoxyalkylated melamine resins, and mixtures thereof. In such embodiments, the resin is selected from the group consisting of an acrylic polyol, polyesterpolyols, polyacrylatepolyols, and mixtures thereof. In such embodiments, the one or more surface additives is selected from the group consisting of silicone modified polyacrylate, alkylsilanes, perfluorinated alkylalcohols, and mixtures thereof.

The present embodiments provide an imaging member comprising a substrate, an imaging layer disposed on the substrate, and an overcoat layer disposed on the imaging layer, wherein the overcoat layer comprises a surface pattern comprising a groove pattern imprinted as described above. It was discovered that an imaging member made from this method exhibited a reduction in torque. For example, an imaging member comprising the overcoat layer having the surface pattern exhibits from about 10% to about 90%, or from about 30% to about 50% reduction in torque as compared to an imaging member comprising an overcoat layer without the surface pattern.

The Substrate

The photoreceptor support substrate 10 may be opaque or substantially transparent, and may comprise any suitable organic or inorganic material having the requisite mechanical properties. The entire substrate can comprise the same material as that in the electrically conductive surface, or the electrically conductive surface can be merely a coating on the substrate. Any suitable electrically conductive material can be employed, such as for example, metal or metal alloy. Electrically conductive materials include copper, brass, nickel, zinc, chromium, stainless steel, conductive plastics and rubbers, aluminum, semitransparent aluminum, steel, cadmium, silver, gold, zirconium, niobium, tantalum, vanadium, hafnium, titanium, nickel, niobium, stainless steel, chromium, tungsten, molybdenum, paper rendered conductive by the inclusion of a suitable material therein or through conditioning in a humid atmosphere to ensure the presence of sufficient water content to render the material conductive, indium, tin, metal oxides, including tin oxide and indium tin oxide, and the like. It could be single metallic compound or dual layers of different metals and/or oxides.

The substrate 10 can also be formulated entirely of an electrically conductive material, or it can be an insulating material including inorganic or organic polymeric materials, such as MYLAR, a commercially available biaxially oriented polyethylene terephthalate from DuPont, or polyethylene naphthalate available as KALEDEX 2000, with a ground plane layer 12 comprising a conductive titanium or titanium/zirconium coating, otherwise a layer of an organic or inorganic material having a semiconductive surface layer, such as indium tin oxide, aluminum, titanium, and the like, or exclusively be made up of a conductive material such as, aluminum, chromium, nickel, brass, other metals and the like. The thickness of the support substrate depends on numerous factors, including mechanical performance and economic considerations.

The substrate 10 may have a number of many different configurations, such as for example, a plate, a cylinder, a drum, a scroll, an endless flexible belt, and the like. In the case of the substrate being in the form of a belt, as shown in FIG. 2, the belt can be seamed or seamless. In embodiments, the photoreceptor herein is in a drum configuration.

The thickness of the substrate 10 depends on numerous factors, including flexibility, mechanical performance, and economic considerations. The thickness of the support substrate 10 of the present embodiments may be at least about 500 micrometers, or no more than about 3.000 micrometers, or be at least about 750 micrometers, or no more than about 2500 micrometers.

The Ground Plane

The electrically conductive ground plane 12 may be an electrically conductive metal layer which may be formed, for example, on the substrate 10 by any suitable coating technique, such as a vacuum depositing technique. Metals include aluminum, zirconium, niobium, tantalum, vanadium, hafnium, titanium, nickel, stainless steel, chromium, tungsten, molybdenum, and other conductive substances, and mixtures thereof. The conductive layer may vary in thickness over substantially wide ranges depending on the optical transparency and flexibility desired for the electrophotoconductive member. Accordingly, for a flexible photoresponsive imaging device, the thickness of the conductive layer may be at least about 20 Angstroms, or no more than about 750 Angstroms, or at least about 50 Angstroms, or no more than about 200 Angstroms for an optimum combination of electrical conductivity, flexibility and light transmission.

Regardless of the technique employed to form the metal layer, a thin layer of metal oxide forms on the outer surface of most metals upon exposure to air. Thus, when other layers overlying the metal layer are characterized as "contiguous" layers, it is intended that these overlying contiguous layers may, in fact, contact a thin metal oxide layer that has formed on the outer surface of the oxidizable metal layer. Generally, for rear erase exposure, a conductive layer light transparency of at least about 15 percent is desirable. The conductive layer need not be limited to metals. Other examples of conductive layers may be combinations of materials such as conductive indium tin oxide as transparent layer for light having a wavelength between about 4000 Angstroms and about 9000 Angstroms or a conductive carbon black dispersed in a polymeric binder as an opaque conductive layer.

The Hole Blocking Layer

After deposition of the electrically conductive ground plane layer, the hole blocking layer 14 may be applied thereto. Electron blocking layers for positively charged photoreceptors allow holes from the imaging surface of the photoreceptor to migrate toward the conductive layer. For negatively charged photoreceptors, any suitable hole blocking layer capable of forming a barrier to prevent hole injection from the conductive layer to the opposite photoconductive layer may be utilized. The hole blocking layer may include polymers such as polyvinylbutyral, epoxy resins, polyesters, polysiloxanes, polyamides, polyurethanes and the like, or may be nitrogen containing siloxanes or nitrogen containing titanium compounds such as trimethoxysilyl propylene diamine, hydrolyzed trimethoxysilyl propyl ethylene diamine, N-beta-(aminoethyl)gamma-amino-propyl trimethoxy silane, isopropyl 4-aminobenzene sulfonyl, di(dodecylbenzene sulfonyl)titanate, isopropyl di(4-aminobenzoyl)isostearoyl titanate, isopropyl tri(N-ethylamino-ethylamino)titanate, isopropyl trianthranil titanate, isopropyl tri(N,N-dimethylethylamino)titanate, titanium-4-amino benzene sulfonate oxyacetate, titanium 4-aminobenzoate isostearate oxyacetate, $[H_2N(CH_2)_4]CH_3Si(OCH_3)_2$, (gamma-aminobutyl) methyl diethoxysilane, and $[H_2N(CH_2)_3]CH_3Si(OCH_3)_2$ (gamma-aminopropyl)methyl diethoxysilane, as disclosed in U.S. Pat. Nos. 4,338,387, 4,286,033 and 4,291,110.

General embodiments of the undercoat layer may comprise a metal oxide and a resin binder. The metal oxides that can be used with the embodiments herein include, but are not limited to, titanium oxide, zinc oxide, tin oxide, aluminum oxide, silicon oxide, zirconium oxide, indium oxide, molybdenum oxide, and mixtures thereof. Undercoat layer binder materials may include, for example, polyesters, MOR-ESTER 49,000 from Morton International Inc., VITEL PE-100, VITEL PE-200, VITEL PE-200D, and VITEL PE-222 from Goodyear Tire and Rubber Co., polyarylates such as ARDEL from AMOCO Production Products, polysulfone from AMOCO Production Products, polyurethanes, and the like.

The hole blocking layer should be continuous and have a thickness of less than about 0.5 micrometer because greater thicknesses may lead to undesirably high residual voltage. A hole blocking layer of between about 0.005 micrometer and about 0.3 micrometer is used because charge neutralization after the exposure step is facilitated and optimum electrical performance is achieved. A thickness of between about 0.03 micrometer and about 0.06 micrometer is used for hole blocking layers for optimum electrical behavior. The blocking layer may be applied by any suitable conventional technique such as spraying, dip coating, draw bar coating, gravure coating, silk screening, air knife coating, reverse roll coating, vacuum deposition, chemical treatment and the like. For convenience in obtaining thin layers, the blocking layer is applied in the form of a dilute solution, with the solvent being removed after deposition of the coating by conventional techniques such as by vacuum, heating and the like. Generally, a weight ratio of hole blocking layer material and solvent of between about 0.05:100 to about 0.5:100 is satisfactory for spray coating.

The Charge Generation Layer

The charge generation layer 18 may thereafter be applied to the undercoat layer 14. Any suitable charge generation binder including a charge generating/photoconductive material, which may be in the form of particles and dispersed in a film forming binder, such as an inactive resin, may be utilized. Examples of charge generating materials include, for example, inorganic photoconductive materials such as amorphous selenium, trigonal selenium, and selenium alloys selected from the group consisting of selenium-tellurium, selenium-tellurium-arsenic; selenium arsenide and mixtures thereof, and organic photoconductive materials including various phthalocyanine pigments such as the X-form of metal free phthalocyanine, metal phthalocyanines such as vanadyl phthalocyanine and copper phthalocyanine, hydroxy gallium phthalocyanines, chlorogallium phthalocyanines, titanyl phthalocyanines, quinacridones, dibromo anthanthrone pigments, benzimidazole perylene, substituted 2,4-diamino-triazines, polynuclear aromatic quinones, enzimidazole perylene, and the like, and mixtures thereof, dispersed in a film forming polymeric binder. Selenium, selenium alloy, benzimidazole perylene, and the like and mixtures thereof may be formed as a continuous, homogeneous charge generation layer. Benzimidazole perylene compositions are well known and described, for example, in U.S. Pat. No. 4,587,189, the entire disclosure thereof being incorporated herein by reference. Multi-charge generation layer compositions may be used where a photoconductive layer enhances or reduces the properties of the charge generation layer. Other suitable charge generating materials known in the art may also be utilized, if desired. The charge generating materials selected should be sensitive to activating radiation having a wavelength between about 400 and about 900 nm during the imagewise radiation exposure step in an electrophotographic imaging process to form an electrostatic latent image. For example, hydroxygallium phthalocyanine absorbs light of a wavelength of from about 370 to about 950 nanometers, as disclosed, for example, in U.S. Pat. No. 5,756,245.

Any suitable inactive resin materials may be employed as a binder in the charge generation layer 18, including those described, for example, in U.S. Pat. No. 3,121,006, the entire disclosure thereof being incorporated herein by reference. Organic resinous binders include thermoplastic and thermosetting resins such as one or more of polycarbonates, polyesters, polyamides, polyurethanes, polystyrenes, polyarylethers, polyarylsulfones, polybutadienes, polysulfones, polyethersulfones, polyethylenes, polypropylenes, polyimides, polymethylpentenes, polyphenylene sulfides, polyvinyl butyral, polyvinyl acetate, polysiloxanes, polyacrylates, polyvinyl acetals, polyamides, polyimides, amino resins, phenylene oxide resins, terephthalic acid resins, epoxy resins, phenolic resins, polystyrene and acrylonitrile copolymers, polyvinylchloride, vinylchloride and vinyl acetate copolymers, acrylate copolymers, alkyd resins, cellulosic film formers, poly(amideimide), styrene-butadiene copolymers, vinylidenechloride/vinylchloride copolymers, vinylacetate/vinylidene chloride copolymers, styrene-alkyd resins, and the like. Another film-forming polymer binder is PCZ-400 (poly (4,4'-dihydroxy-diphenyl-1-1-cyclohexane) which has a viscosity-molecular weight of 40,000 and is available from Mitsubishi Gas Chemical Corporation (Tokyo, Japan).

The charge generating material can be present in the resinous binder composition in various amounts. Generally, at least about 5 percent by volume, or no more than about 90 percent by volume of the charge generating material is dispersed in at least about 95 percent by volume, or no more than about 10 percent by volume of the resinous binder, and more specifically at least about 20 percent, or no more than about 60 percent by volume of the charge generating material is dispersed in at least about 80 percent by volume, or no more than about 40 percent by volume of the resinous binder composition.

In specific embodiments, the charge generation layer 18 may have a thickness of at least about 0.1 μm, or no more than about 2 μm, or of at least about 0.2 μm, or no more than about 1 μm. These embodiments may be comprised of chlorogallium phthalocyanine or hydroxygallium phthalocyanine or mixtures thereof. The charge generation layer 18 containing the charge generating material and the resinous binder material generally ranges in thickness of at least about 0.1 μm, or no more than about 5 μm, for example, from about 0.2 μm to about 3 μm when dry. The charge generation layer thickness is generally related to binder content. Higher binder content compositions generally employ thicker layers for charge generation.

The Charge Transport Layer

In a drum photoreceptor, the charge transport layer comprises a single layer of the same composition. As such, the charge transport layer will be discussed specifically in terms of a single layer 20, but the details will be also applicable to an embodiment having dual charge transport layers. The charge transport layer 20 is thereafter applied over the charge generation layer 18 and may include any suitable transparent organic polymer or non-polymeric material capable of supporting the injection of photogenerated holes or electrons from the charge generation layer 18 and capable of allowing the transport of these holes/electrons through the charge transport layer to selectively discharge the surface charge on the imaging member surface. In one embodiment, the charge transport layer 20 not only serves to transport holes, but also protects the charge generation layer 18 from abrasion or chemical attack and may therefore extend the service life of the imaging member. The charge transport layer 20 can be a substantially non-photoconductive material, but one which supports the injection of photogenerated holes from the charge generation layer 18.

The layer 20 is normally transparent in a wavelength region in which the electrophotographic imaging member is to be used when exposure is affected thereto to ensure that most of the incident radiation is utilized by the underlying charge generation layer 18. The charge transport layer should exhibit excellent optical transparency with negligible light absorption and no charge generation when exposed to a wavelength of light useful in xerography, e.g., 400 to 900 nanometers. In the case when the photoreceptor is prepared with the use of a transparent substrate 10 and also a transparent or partially transparent conductive layer 12, imagewise exposure or erase may be accomplished through the substrate 10 with all light passing through the back side of the substrate. In this case, the materials of the layer 20 need not transmit light in the wavelength region of use if the charge generation layer 18 is sandwiched between the substrate and the charge transport layer 20. The charge transport layer 20 in conjunction with the charge generation layer 18 is an insulator to the extent that an electrostatic charge placed on the charge transport layer is not conducted in the absence of illumination. The charge transport layer 20 should trap minimal charges as the charge passes through it during the discharging process.

The charge transport layer 20 may include any suitable charge transport component or activating compound useful as an additive dissolved or molecularly dispersed in an electrically inactive polymeric material, such as a polycarbonate binder, to form a solid solution and thereby making this material electrically active. "Dissolved" refers, for example, to forming a solution in which the small molecule is dissolved in the polymer to form a homogeneous phase; and molecularly dispersed in embodiments refers, for example, to charge transporting molecules dispersed in the polymer, the small molecules being dispersed in the polymer on a molecular scale. The charge transport component may be added to a film forming polymeric material which is otherwise incapable of supporting the injection of photogenerated holes from the charge generation material and incapable of allowing the transport of these holes through. This addition converts the electrically inactive polymeric material to a material capable of supporting the injection of photogenerated holes from the charge generation layer 18 and capable of allowing the transport of these holes through the charge transport layer 20 in order to discharge the surface charge on the charge transport layer. The high mobility charge transport component may comprise small molecules of an organic compound which cooperate to transport charge between molecules and ultimately to the surface of the charge transport layer. For example, but not limited to, N,N'-diphenyl-N,N-bis(3-methyl phenyl)-1,1'-biphenyl-4,4'-diamine (TPD), other arylamines like triphenyl amine, N,N,N',N'-tetra-p-tolyl-1,1'-biphenyl-4,4'-diamine (TM-TPD), and the like.

A number of charge transport compounds can be included in the charge transport layer, which layer generally is of a thickness of from about 5 to about 75 micrometers, and more specifically, of a thickness of from about 15 to about 40 micrometers. Examples of charge transport components are aryl amines of the following formulas/structures:

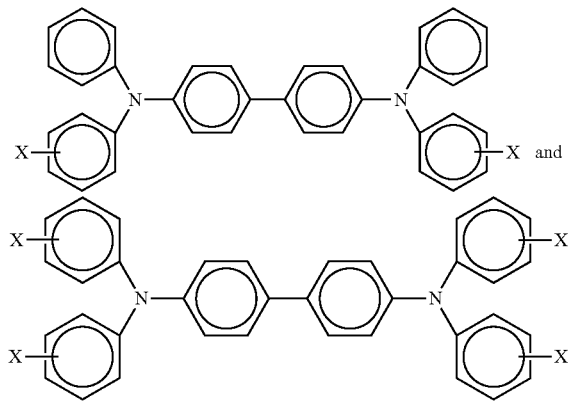

wherein X is a suitable hydrocarbon like alkyl, alkoxy, aryl, and derivatives thereof; a halogen, or mixtures thereof, and especially those substituents selected from the group consisting of Cl and $CH_3$; and molecules of the following formulas

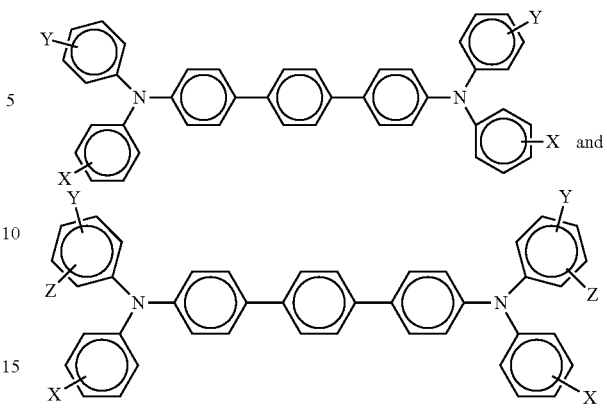

wherein X, Y and Z are independently alkyl, alkoxy, aryl, a halogen, or mixtures thereof, and wherein at least one of Y and Z are present.

Alkyl and alkoxy contain, for example, from 1 to about 25 carbon atoms, and more specifically, from 1 to about 12 carbon atoms, such as methyl, ethyl, propyl, butyl, pentyl, and the corresponding alkoxides. Aryl can contain from 6 to about 36 carbon atoms, such as phenyl, and the like. Halogen includes chloride, bromide, iodide, and fluoride. Substituted alkyls, alkoxys, and aryls can also be selected in embodiments.

Examples of specific aryl amines that can be selected for the charge transport layer include N,N'-diphenyl-N,N'-bis(alkylphenyl)-1,1-biphenyl-4,4'-diamine wherein alkyl is selected from the group consisting of methyl, ethyl, propyl, butyl, hexyl, and the like; N,N'-diphenyl-N,N'-bis(halophenyl)-1,1'-biphenyl-4,4'-diamine wherein the halo substituent is a chloro substituent; N,N'-bis(4-butylphenyl)-N,N'-di-p-tolyl-[p-terphenyl]-4,4"-diamine, N,N'-bis(4-butylphenyl)-N,N'-di-m-tolyl-[p-terphenyl]-4,4"-diamine, N,N'-bis(4-butylphenyl)-N,N'-di-o-tolyl-[p-terphenyl]-4,4"-diamine, N,N'-bis(4-butylphenyl)-N,N'-bis-(4-isopropylphenyl)-[p-terphenyl]-4,4"-diamine, N,N'-bis(4-butylphenyl)-N,N'-bis-(2-ethyl-6-methylphenyl)-[p-terphenyl]-4,4"-diamine, N,N'-bis(4-butylphenyl)-N,N'-bis-(2,5-dimethylphenyl)-[p-terphenyl]-4,4'-diamine, N,N'-diphenyl-N,N'-bis(3-chlorophenyl)-[p-terphenyl]-4,4"-diamine, and the like. Other known charge transport layer molecules may be selected in embodiments, reference for example, U.S. Pat. Nos. 4,921,773 and 4,464,450, the disclosures of which are totally incorporated herein by reference.

Examples of the binder materials selected for the charge transport layers include components, such as those described in U.S. Pat. No. 3,121,006, the disclosure of which is totally incorporated herein by reference. Specific examples of polymer binder materials include polycarbonates, polyarylates, acrylate polymers, vinyl polymers, cellulose polymers, polyesters, polysiloxanes, polyamides, polyurethanes, poly(cyclo olefins), and epoxies, and random or alternating copolymers thereof. In embodiments, the charge transport layer, such as a hole transport layer, may have a thickness of at least about 10 μm, or no more than about 40 μm.

Examples of components or materials optionally incorporated into the charge transport layers or at least one charge transport layer to, for example, enable improved lateral charge migration (LCM) resistance include hindered phenolic antioxidants such as tetrakis methylene(3,5-di-tert-butyl-4-hydroxy hydrocinnamate) methane (IRGANOX® 1010, available from Ciba Specialty Chemical), butylated hydroxytoluene (BHT), and other hindered phenolic antioxidants including SUMILIZER™ BHT-R, MDP-S, BBM-S. WX-R, NW, BP-76, BP-101, GA-80, GM and GS (available from Sumitomo Chemical Co., Ltd.), IRGANOX® 1035, 1076, 1098, 1135, 1141, 1222, 1330, 1425WL, 1520L, 245, 259, 3114, 3790, 5057 and 565 (available from Ciba Specialties Chemicals), and ADEKA STAB™ AO-20, AO-30, AO-40, AO-50, AO-60, AO-70, AO-80 and AO-330 (available from Asahi Denka Co., Ltd.); hindered amine antioxidants such as SANOL™ LS-2626, LS-765, LS-770 and LS-744 (available from SANKYO CO., Ltd.), TINUVIN® 144 and 622LD (available from Ciba Specialties Chemicals), MARK™ LA57, LA67, LA62, LA68 and LA63 (available from Asahi Denka Co., Ltd.), and SUMILIZER® TPS (available from Sumitomo Chemical Co., Ltd.); thioether antioxidants such as SUMILIZER® TP-D (available from Sumitomo Chemical Co., Ltd); phosphite antioxidants such as MARK™ 2112, PEP-8, PEP-24G, PEP-36, 329K and HP-10 (available from Asahi Denka Co., Ltd.); other molecules such as bis(4-diethylamino-2-methylphenyl) phenylmethane (BDETPM), bis-[2-methyl-4-(N-2-hydroxyethyl-N-ethyl-aminophenyl)]-phenylmethane (DHTPM), and the like. The weight percent of the antioxidant in at least one of the charge transport layer is from about 0 to about 20, from about 1 to about 10, or from about 3 to about 8 weight percent.

The charge transport layer should be an insulator to the extent that the electrostatic charge placed on the hole transport layer is not conducted in the absence of illumination at a rate sufficient to prevent formation and retention of an electrostatic latent image thereon. The charge transport layer is substantially nonabsorbing to visible light or radiation in the region of intended use, but is electrically "active" in that it allows the injection of photogenerated holes from the photoconductive layer, that is the charge generation layer, and allows these holes to be transported through itself to selectively discharge a surface charge on the surface of the active layer.

In addition, in the present embodiments using a belt configuration, the charge transport layer may consist of a single pass charge transport layer or a dual pass charge transport layer (or dual layer charge transport layer) with the same or different transport molecule ratios. In these embodiments, the dual layer charge transport layer has a total thickness of from about 10 μm to about 40 μm. In other embodiments, each layer of the dual layer charge transport layer may have an individual thickness of from 2 μm to about 20 μm. Moreover, the charge transport layer may be configured such that it is used as a top layer of the photoreceptor to inhibit crystallization at the interface of the charge transport layer and the overcoat layer. In another embodiment, the charge transport layer may be configured such that it is used as a first pass charge transport layer to inhibit microcrystallization occurring at the interface between the first pass and second pass layers.

The present embodiments thus provide an imaging member comprising a substrate, a charge generation layer disposed on the substrate, and a charge transport layer disposed on the charge generation layer, wherein the charge transport layer comprises a groove pattern imprinted on the surface of the charge transport layer as described above. It was discovered that an imaging member made from this method exhibited a reduction in torque. For example, an imaging member comprising the overcoat layer having the surface pattern exhibits from about 10% to about 90%. or from about 30% to about 50% reduction in torque as compared to an imaging member comprising an overcoat layer without the surface pattern.

Any suitable and conventional technique may be utilized to form and thereafter apply the charge transport layer mixture to the supporting substrate layer. The charge transport layer may be formed in a single coating step or in multiple coating steps. Dip coating, ring coating, spray, gravure or any other drum coating methods may be used.

Drying of the deposited coating may be effected by any suitable conventional technique such as oven drying, infra red radiation drying, air drying and the like. The thickness of the charge transport layer after drying is from about 10 μm to about 40 μm or from about 12 μm to about 36 μm for optimum photoelectrical and mechanical results. In another embodiment the thickness is from about 14 μm to about 36 μm.

The Adhesive Layer

An optional separate adhesive interface layer may be provided in certain configurations, such as for example, in flexible web configurations. In the embodiment illustrated in FIG. 1, the interface layer would be situated between the blocking layer 14 and the charge generation layer 18. The interface layer may include a copolyester resin. Exemplary polyester resins which may be utilized for the interface layer include polyarylatepolyvinylbutyrals, such as ARDEL POLYARYLATE (U-100) commercially available from Toyota Hsutsu Inc., VITEL PE-100, VITEL PE-200, VITEL PE-200D, and VITEL PE-222, all from Bostik, 49,000 polyester from Rohm Hass, polyvinyl butyral, and the like. The adhesive interface layer may be applied directly to the hole blocking layer 14. Thus, the adhesive interface layer in embodiments is in direct contiguous contact with both the underlying hole blocking layer 14 and the overlying charge generator layer 18 to enhance adhesion bonding to provide linkage. In yet other embodiments, the adhesive interface layer is entirely omitted.

Any suitable solvent or solvent mixtures may be employed to form a coating solution of the polyester for the adhesive interface layer. Solvents may include tetrahydrofuran, toluene, monochlorobenzene, methylene chloride, cyclohexanone, and the like, and mixtures thereof. Any other suitable and conventional technique may be used to mix and thereafter apply the adhesive layer coating mixture to the hole blocking layer. Application techniques may include spraying, dip coating, roll coating, wire wound rod coating, and the like. Drying of the deposited wet coating may be effected by any suitable conventional process, such as oven drying, infra red radiation drying, air drying, and the like.

The adhesive interface layer may have a thickness of at least about 0.01 micrometers, or no more than about 900 micrometers after drying. In embodiments, the dried thickness is from about 0.03 micrometers to about 1 micrometer.

The Ground Strip

The ground strip may comprise a film forming polymer binder and electrically conductive particles. Any suitable electrically conductive particles may be used in the electrically conductive ground strip layer 19. The ground strip 19 may comprise materials which include those enumerated in U.S. Pat. No. 4,664,995. Electrically conductive particles include carbon black, graphite, copper, silver, gold, nickel, tantalum, chromium, zirconium, vanadium, niobium, indium tin oxide and the like. The electrically conductive particles may have any suitable shape. Shapes may include irregular, granular, spherical, elliptical, cubic, flake, filament, and the like. The electrically conductive particles should have a particle size less than the thickness of the electrically conductive ground strip layer to avoid an electrically conductive ground strip layer having an excessively irregular outer surface. An average particle size of less than about 10 micrometers generally avoids excessive protrusion of the electrically conductive particles at the outer surface of the dried ground strip layer and ensures relatively uniform dispersion of the particles throughout the matrix of the dried ground strip layer. The concentration of the conductive particles to be used in the ground strip depends on factors such as the conductivity of the specific conductive particles utilized.

The ground strip layer may have a thickness of at least about 7 micrometers, or no more than about 42 micrometers, or of at least about 14 micrometers, or no more than about 27 micrometers.

The Anti-Curl Back Coating Layer

The anti-curl back coating 1 may comprise organic polymers or inorganic polymers that are electrically insulating or slightly semi-conductive. The anti-curl back coating provides flatness and/or abrasion resistance.

Anti-curl back coating 1 may be formed at the back side of the substrate 2, opposite to the imaging layers. The anti-curl back coating may comprise a film forming resin binder and an adhesion promoter additive. The resin binder may be the same resins as the resin binders of the charge transport layer discussed above. Examples of film forming resins include polyacrylate, polystyrene, bisphenol polycarbonate, poly(4,4'-isopropylidene diphenyl carbonate), 4,4'-cyclohexylidene diphenyl polycarbonate, and the like. Adhesion promoters used as additives include 49,000 (du Pont), Vitel PE-100; Vitel PE-200, Vitel PE-307 (Goodyear), and the like. Usually from about 1 to about 15 weight percent adhesion promoter is selected for film forming resin addition. The thickness of the anti-curl back coating is at least about 3 micrometers, or no more than about 35 micrometers, or about 14 micrometers.

Various exemplary embodiments encompassed herein include a method of imaging which includes generating an electrostatic latent image on an imaging member, developing a latent image, and transferring the developed electrostatic image to a suitable substrate.

While the description above refers to particular embodiments, it will be understood that many modifications may be made without departing from the spirit thereof. The accompanying claims are intended to cover such modifications as would fall within the true scope and spirit of embodiments herein.

The presently disclosed embodiments are, therefore, to be considered in all respects as illustrative and not restrictive, the scope of embodiments being indicated by the appended claims rather than the foregoing description. All changes that come within the meaning of and range of equivalency of the claims are intended to be embraced therein.

EXAMPLES

The examples set forth herein below and is illustrative of different compositions and conditions that can be used in practicing the present embodiments. All proportions are by weight unless otherwise indicated. It will be apparent, however, that the embodiments can be practiced with many types of compositions and can have many different uses in accordance with the disclosure above and as pointed out hereinafter.

Example 1

Manufacture of Imprinted Photoreceptor

An electrophotographic photoreceptor was fabricated in the following manner. A coating solution for an undercoat layer comprising 100 parts of a ziconium compound (trade name: Orgatics ZC540, manufactured by Matsumoto Seiyaku Co., Ltd.), 10 parts of a silane compound (trade name: A110, manufactured by Nippon Unicar Co., Ltd), 400 parts of isopropanol solution and 200 parts of butanol was prepared. The coating solution was applied onto a cylindrical aluminum (Al) substrate subjected to honing treatment by dip coating, and dried by heating at 150° C. for 10 minutes to form an undercoat layer having a film thickness of 0.1 micrometer.

A 0.5 micron thick charge generating layer was subsequently dip coated on top of the undercoat layer from a dispersion of Type V hydroxygallium phthalocyanine (12 parts), alkylhydroxy gallium phthalocyanine (3 parts), and a vinyl chloride/vinyl acetate copolymer, VMCH (Mn=27,000, about 86 weight percent of vinyl chloride, about 13 weight percent of vinyl acetate and about 1 weight percent of maleic acid) available from Dow Chemical (10 parts), in 475 parts of n-butylacetate.

Subsequently, a 25 μm thick charge transport layer (CTL) was dip coated on top of the charge generating layer from a solution of N,N'-diphenyl-N,N'-bis(3-methylphenyl)-1,1'-biphenyl-4,4'-diamine (82.3 parts), 2.1 parts of 2,6-di-tert-butyl-4-methylphenol (BHT) from Aldrich and a polycarbonate, PCZ-400 [poly(4,4'-dihydroxy-diphenyl-1-1-cyclohexane), M.sub.w=40,000] available from Mitsubishi Gas Chemical Company, Ltd. (123.5 parts) in a mixture of 546 parts of tetrahydrofuran (THF) and 234 parts of monochlorobenzene. The CTL was dried at 115.degree. C. for 60 minutes.

An overcoat layer comprising 65% N,N'-diphenyl-N,N'-bis(3-hydroxyphenyl)-[1,1'-biphenyl]-4,4'-dia-mine, 33% Hexamethoxymethylmelamine, 1% Nacrue XP357 available from King Industries, Silclean 3700 available from BYK additives, at 30% solids in 1-methoxy-2-propanol was dip coated onto a photoreceptor drum and ambient dried from about 5 minutes to about 10 minutes. Imprinting was performed using rigid wire wound rod against the overcoat layer at force of 170 Newtons. Rotation of the photoreceptor drum was maintained at about 60 rpm or higher during imprinting. Forced air was maintained against the overcoat layer surface during imprinting and the temperature of the overcoat layer surface was maintained at about 100° C. during imprinting. The patterned overcoat layer was then cured in an oven at 155° C. for about 40 minutes.

The inventive photoreceptor was prepared in 15 different trial coatings, with ambient air dry time, rotation speed and forced air heat temperature being varied.

Control

A control photoreceptor was prepared by dip coating the same overcoat layer onto a photoreceptor drum. The surface of the overcoat layer, however, was not imprinted before curing.

Results

A very uniform groove pattern was obtained under certain conditions. For example, it was discovered that a desirable groove pattern was obtained when the ambient air dry time is between 5 to about 10 minutes (any time before 5 minutes results in destruction of the coating (transfer to imprint roll), and any time after 10 minutes results in no pattern at all), rotation speed is above 30 rpm (any speed below 30 rpm results is loss of pattern or poorly defined pattern as time away from imprint roller becomes too great), and the forced air creates drum surface temperatures (as measured with IR probe) of 100° C. or higher (any temperater lower than 100° C. will result in transient pattern which completely disappears during curing).

Figure 5:
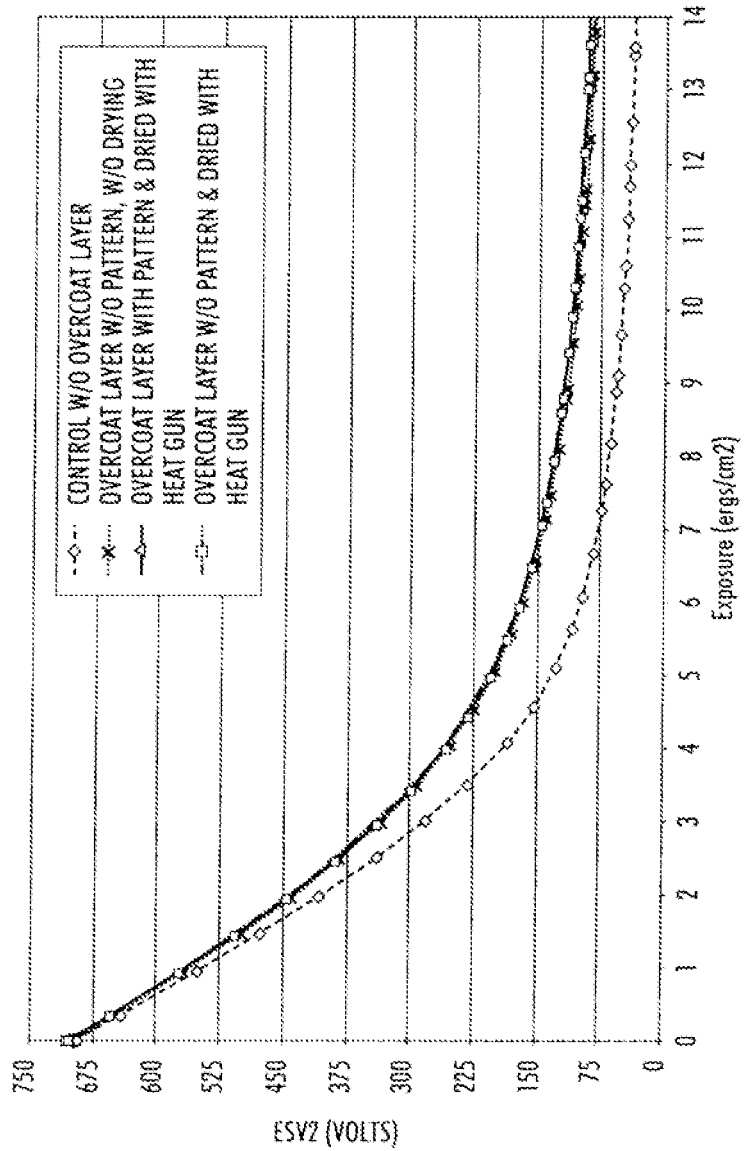
FIG. 5 is a graph illustrating photo-induced discharge (PIDC) in imaging members made according to the present embodiments.

The electrical performance characteristics of the above prepared electrophotographic photoreceptors such as the photo-induced discharge curve (PIDC) were tested in a scanner. The scanner is known in the industry and equipped with means to rotate the drum while it is electrically charged and discharged. The charge on the photoconductor sample was monitored through use of electrostatic probes placed at precise positions around the circumference of the device. The photoreceptor devices were charged to a negative potential of 700 Volts. As the devices rotated, the initial charging potentials were measured by voltage probe 1. The photoconductor samples were then exposed to monochromatic radiation of known intensity, and the surface potential measured by voltage probes 2 and 3. Finally, the samples were exposed to an erase lamp of appropriate intensity and wavelength and any residual potential was measured by voltage probe 4. The process was repeated under the control of the scanner's computer, and the data was stored in the computer. The PIDC was obtained by plotting the potentials at voltage probes 2 and 3 as a function of the light energy. The photoreceptors as prepared in Examples 1 showed similar PIDC characteristics as the control or Comparative Example device. FIG. 5 is a graph illustrating the results of the electrical tests for the patterned photoreceptors of the present embodiments versus the control photoreceptor. As seen, the photo-induced discharge characteristics are the same for both the patterned and unpatterned overcoated photoreceptors demonstrating that the incorporation of the particles did not have a negative impact on electrical performance.

Figure 6:
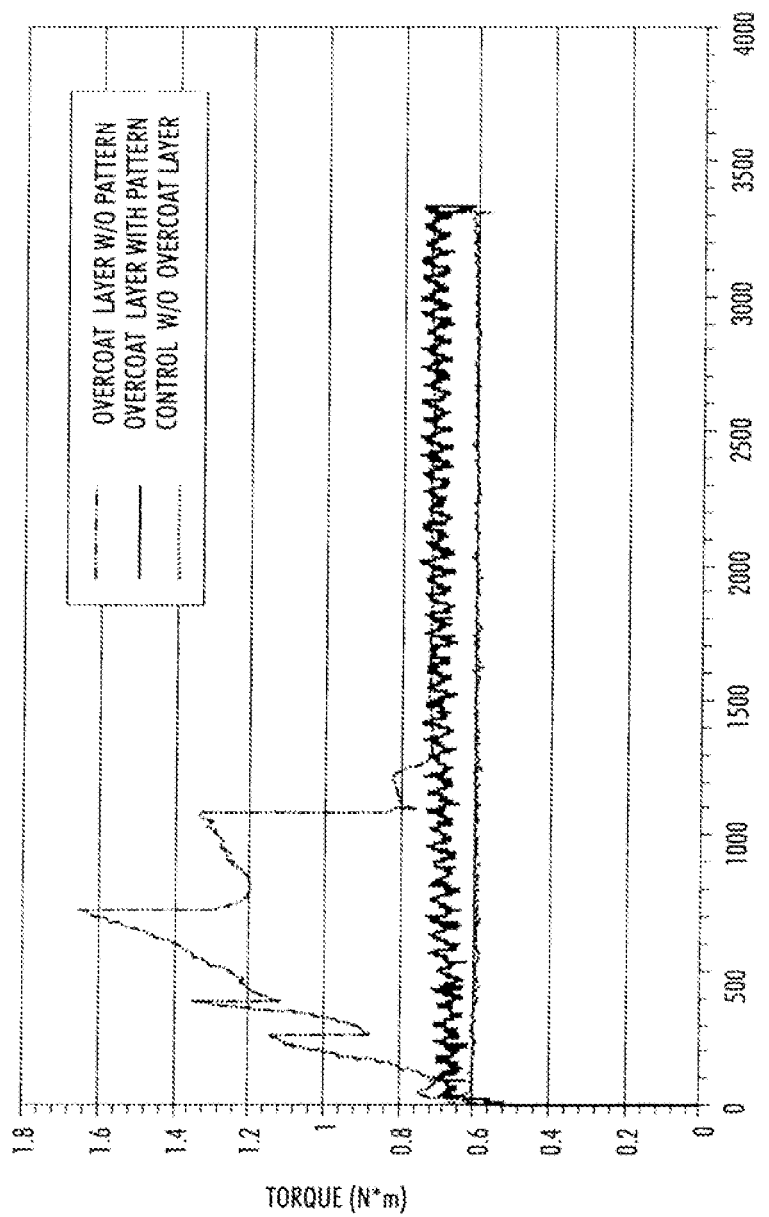
FIG. 6 is a graph illustrating torque reduction in imaging members made according to the present embodiments.

FIG. 6 is a graph illustrating the results of the torque measurements for the patterned photoreceptors of the present embodiments versus the control photoreceptor. As seen, the initial torque results show dramatic reduction in blade failures and significant reduction in initial torque.

In summary, the present embodiments provide a method and system for producing an imprinted outer layer for a photoreceptor. The imprinted outer layer has a groove pattern which offers significantly improved interaction with the CRU cleaning system (blade) and improved torque.

All the patents and applications referred to herein are hereby specifically, and totally incorporated herein by reference in their entirety in the instant specification.

It will be appreciated that several of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims. Unless specifically recited in a claim, steps or components of claims should not be implied or imported from the specification or any other claims as to any particular order, number, position, size, shape, angle, color, or material.

What is claimed is:

1. A method for making an imprinted imaging member comprising:

coating an imaging member with an outer layer formulation;

ambient drying the outer layer formulation to form an outer layer on the imaging member; and pressing a rigid rod having a wire wound around the rod to form a surface pattern on the rod and pressing the rod and wire against the outer layer on the imaging member, wherein the rigid rod and wire are pressed against the outer layer at a force of from about 10 Newtons to about 1000 Newtons; and rolling the rigid rod and wire against the outer layer on the imaging member to form a surface pattern homogeneously imprinted on the surface of the outer layer such that the surface pattern has a homogeneous roughness and periodicity; and curing the imaging member to form an imprinted imaging member.

2. The method of claim 1, wherein pressing and rolling step is performed at an elevated temperature.

3. The method of claim 2, wherein the elevated temperature is from about 50° C. to about 200° C.

4. The method of claim 1, wherein the outer layer comprises a hole transport molecule selected from the group consisting of N,N'-diphenyl-N—N'-bis(hydroxyphenyl)-[1,1'-terphenyl]-4,4'-diamine, and N,N'-diphenyl -N,N'-bis(3-hydroxyphenyl)-[1,1'-biphenyl]-4,4'-dia-mine, and mixtures thereof.

5. The method of claim 1, wherein the outer layer comprises a crosslinking agent selected from the group consisting of methylated formaldehyde-melamine resin, methoxymethylated melamine resin, ethoxymethylated melamine resin, propoxymethylated melamine resin, butoxymethylated melamine resin, hexamethylol melamine resin, alkoxyalkylated melamine resins, and mixtures thereof.

6. The method of claim 1, wherein the outer layer comprises a resin selected from the group consisting of an acrylic polyol, polyesterpolyols, polyacrylatepolyols, and mixtures thereof and one or more surface additives selected from the group consisting of silicone modified polyacrylate, alkylsilanes, perfluorinated alkylalcohols, and mixtures thereof.

7. The method of claim 1, wherein the outer layer has a thickness of from about 1 micron to about 20 microns.

8. The method of claim 1, wherein the rigid rod is rolled against the outer layer at a speed greater than 30 rpm.

9. The method of claim 1, wherein the curing step is performed at a temperature of from about 120° C. to about 170° C. for about 5 minutes to about 60 minutes.

10. The method of claim 1, wherein the ambient drying time is for about 5 minutes to about 15 minutes.

11. The method of claim 1, wherein the rigid rod has a diameter of about equal diameter to the imaging member drum.

12. The method of claim 1, wherein the rigid rod is pressed against the outer layer at a force of from about 100 Newtons to about 200 Newtons.

* * * * *